United States Patent [19]
Masuda

[11] Patent Number: 6,102,542
[45] Date of Patent: Aug. 15, 2000

[54] EYEGLASS ASSEMBLY

[75] Inventor: Noriyuki Masuda, Higashiosaka, Japan

[73] Assignee: Yamamoto Kogaku Co., Ltd., Osaka, Japan

[21] Appl. No.: 09/256,655

[22] Filed: Feb. 23, 1999

[30] Foreign Application Priority Data

Feb. 23, 1998 [JP] Japan .................................. 10-040681

[51] Int. Cl.[7] ....................................................... G02C 1/02

[52] U.S. Cl. .......................................... 351/110; 351/140

[58] Field of Search ............................... 351/110, 83, 86, 351/140, 141, 150, 41

[56] References Cited

U.S. PATENT DOCUMENTS 5,386,254  1/1995  Kahaney .................................. 351/86

Primary Examiner—Hung Xuan Dang
Attorney, Agent, or Firm—Koda & Androlia

[57] ABSTRACT

A pair of eyeglasses capable of maintaining the curve of an eyeglass main body even if temples are opened excessively wherein the temples do not pinch the head of a user to otherwise make the eyeglasses uncomfortable to wear even if the eyeglass main body is curved more sharply. The eyeglasses comprise a pair of left and right temples attached to left and right sides of an eyeglass main body through temple attachment members having a fork shape consisting of a fixed part fixedly attached to the eyeglass main body and a rocking part to which one end of each of the temples is attached.

8 Claims, 11 Drawing Sheets

EYEGLASS ASSEMBLY

BACKGROUND OF THE INVENTION

1. Field of the Invention

The present invention relates to eyeglasses used as, for example, sunglasses and goggles, etc.

2. Description of the Prior Art

A pair of eyeglasses which has been conventionally used consists of, as shown in FIG. 10, a main body 30 (single-lens structure) and a pair of left and right side temples 32 attached to the main body 30 through frames 31 fixed to left and right side upper ends of the main body 30. In the conventional eyeglasses of this type, the lens is desirably curved sharply so as to prevent wind and light from entering from the sides when used in various sporting events such as a bicycle event.

In addition, according to the conventional eyeglasses of this type, as shown in FIG. 11, engagement shaft holes 33 are provided at the frames 31, and protrusions 34 provided at forked front end portions of the temples 32 are engaged with the shaft holes 33. Due to this, the temple 32 contacts the outer end 35 of the frame 31, thus being prevented from further rotating outward. As a result, if the temple 32 is forced to be opened further, the main body 30 is disadvantageously deformed and its original curved-shape is damaged. In addition, if the eyeglass main body 30 is curved more sharply, the opening angle of the temple 32 becomes narrower. As a result, the temple 32 disadvantageously pinches the head of a user and the eyeglasses become uncomfortable to wear.

Under the circumstances, according to the conventional eyeglasses, the sphere of the main body 30 is normally about 6 curves and it has been difficult to merchandise ones having a sphere curved more sharply. By the 6-curve sphere, it means a sphere having a radius of curvature R1 (mm) thereof (or front surface) set at:

$$R1=(N-1)\times 100/D[D=6]$$

where N is the index of refraction of material.

SUMMARY OF THE INVENTION

It is, therefore, an object of the present invention to provide a pair of eyeglasses which can maintain the curve of an eyeglass main body even if a temple or temples are opened excessively and wherein the temple or temples do not pinch the head of a user to otherwise make the eyeglasses uncomfortable to wear even if the eyeglass main body is curved more sharply.

To accomplish the above object, the present invention takes the following technical measures:

Eyeglasses according to the present invention are characterized in that a pair of left and right temples are attached to left and right sides of an eyeglass main body by temple attachment members, respectively, and that each of the temple attachment members has a fork shape consisting of a fixed part fixedly attached to the eyeglass main body and a rocking part to which one of the temples is attached.

The temple attachment member may be provided on an upper front surface of each of left and right side portions of the eyeglass main body.

The eyeglass main body may be a single-lens structure.

A hook may be provided to hook the rocking part of the temple attachment member to the eyeglass main body to thereby prevent the rocking part from being opened beyond a predetermined level.

DETAILED DESCRIPTION OF THE PREFERRED EMBODIMENTS

Embodiments of the present invention will now be described with reference to the accompanying drawings.

Figure 2:
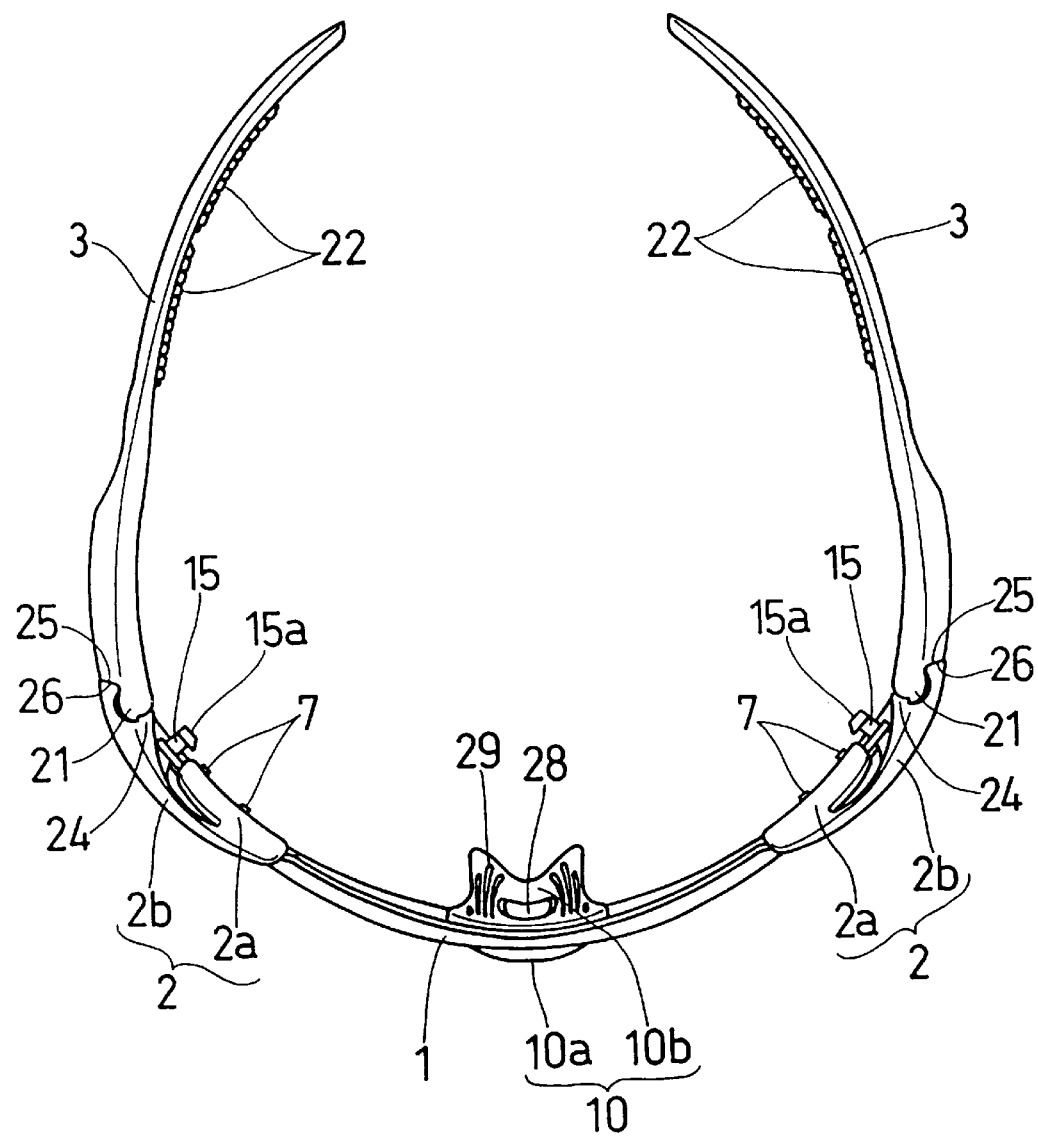
FIG. 2 is a plan view of the embodiment of eyeglasses according to the present invention.

Eyeglasses according to the present invention comprise a pair of left and right temples 3 attached to the left and right side portions of an eyeglass main body 1 through temple attachment members 2, respectively. The temple attachment member 2 is fork-shaped (or bifurcated when viewed from above as shown in FIG. 2) and consists of a fixed part 2a fixedly attached to the eyeglass main body 1 and a rocking part 2b to which the temple 3 is attached.

The embodiment is described with reference to sports eyeglasses.

The eyeglass main body 1 can be a flexible, elastic single-lens structure provided with a spherical surface of, for example, 6.75 curves. The eyeglass main body 1 (or single-lens main body) is desirably made of impact-resistant plastics such as polycarbonate and ABS (acrylonitrile-butadien-styrene) resin.

Figure 1:
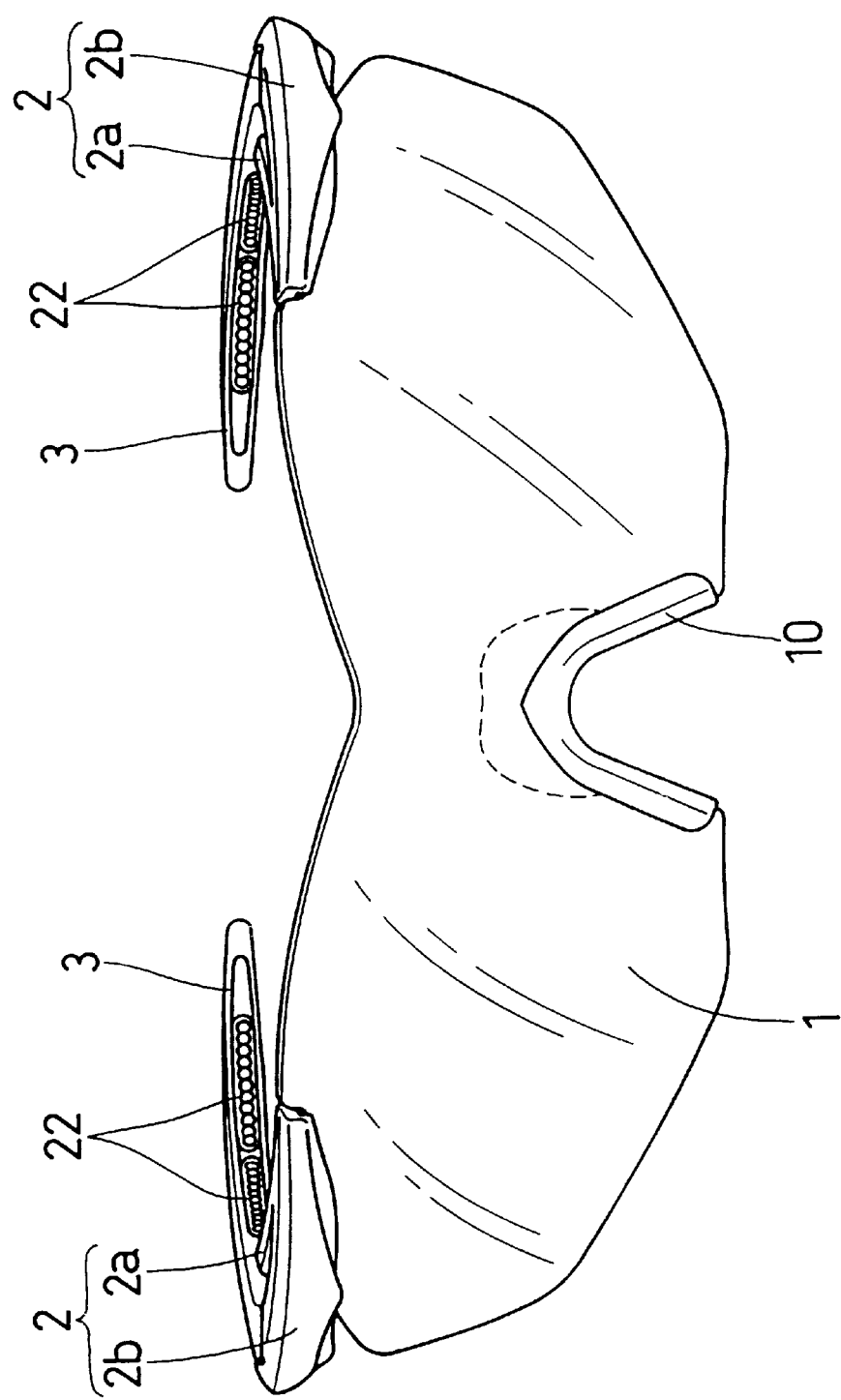
FIG. 1 is a perspective front view of one embodiment of eyeglasses according to the present invention.
Figure 3:
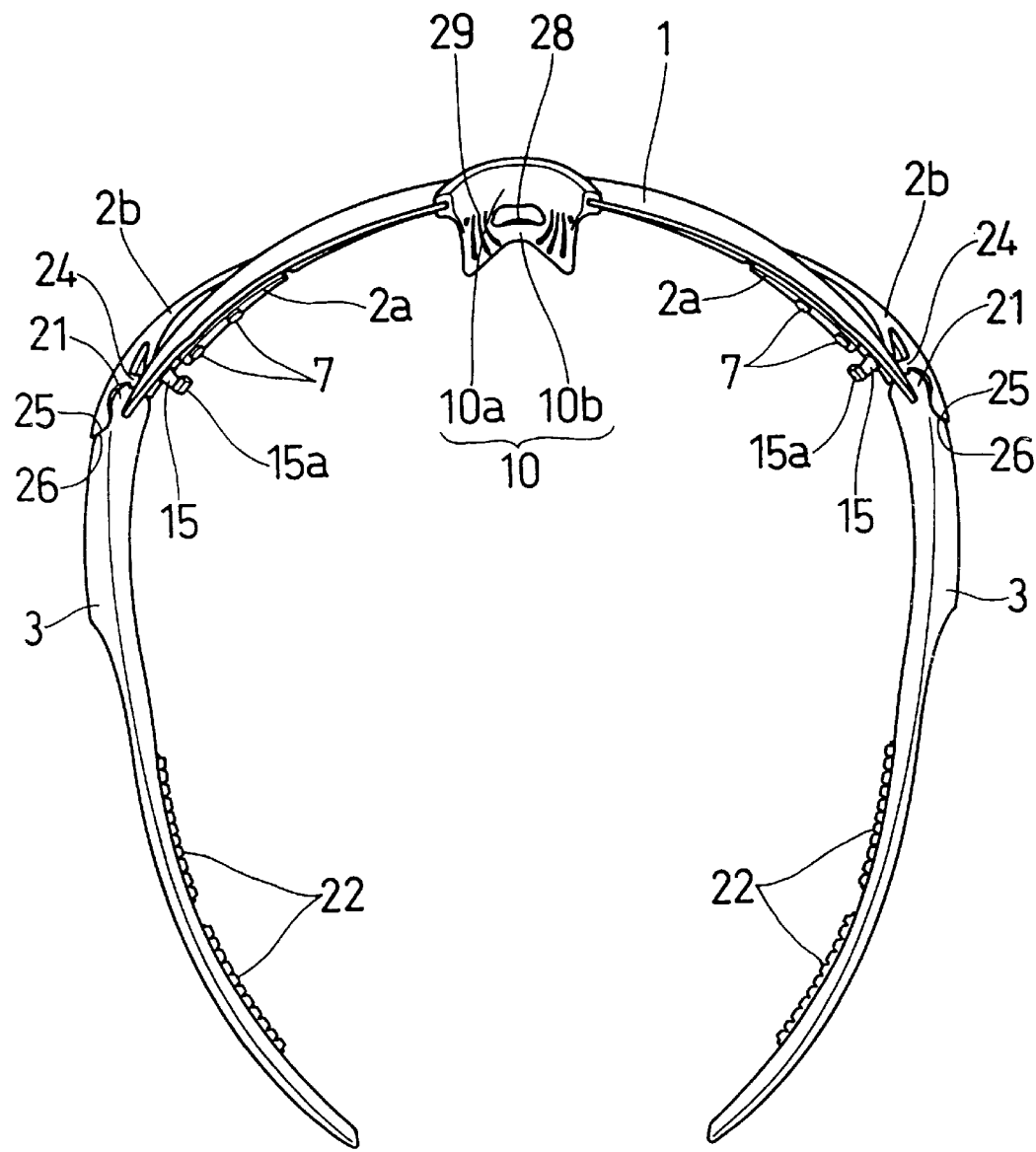
FIG. 3 is a bottom view of the embodiment of eyeglasses according to the present invention.
Figure 4:
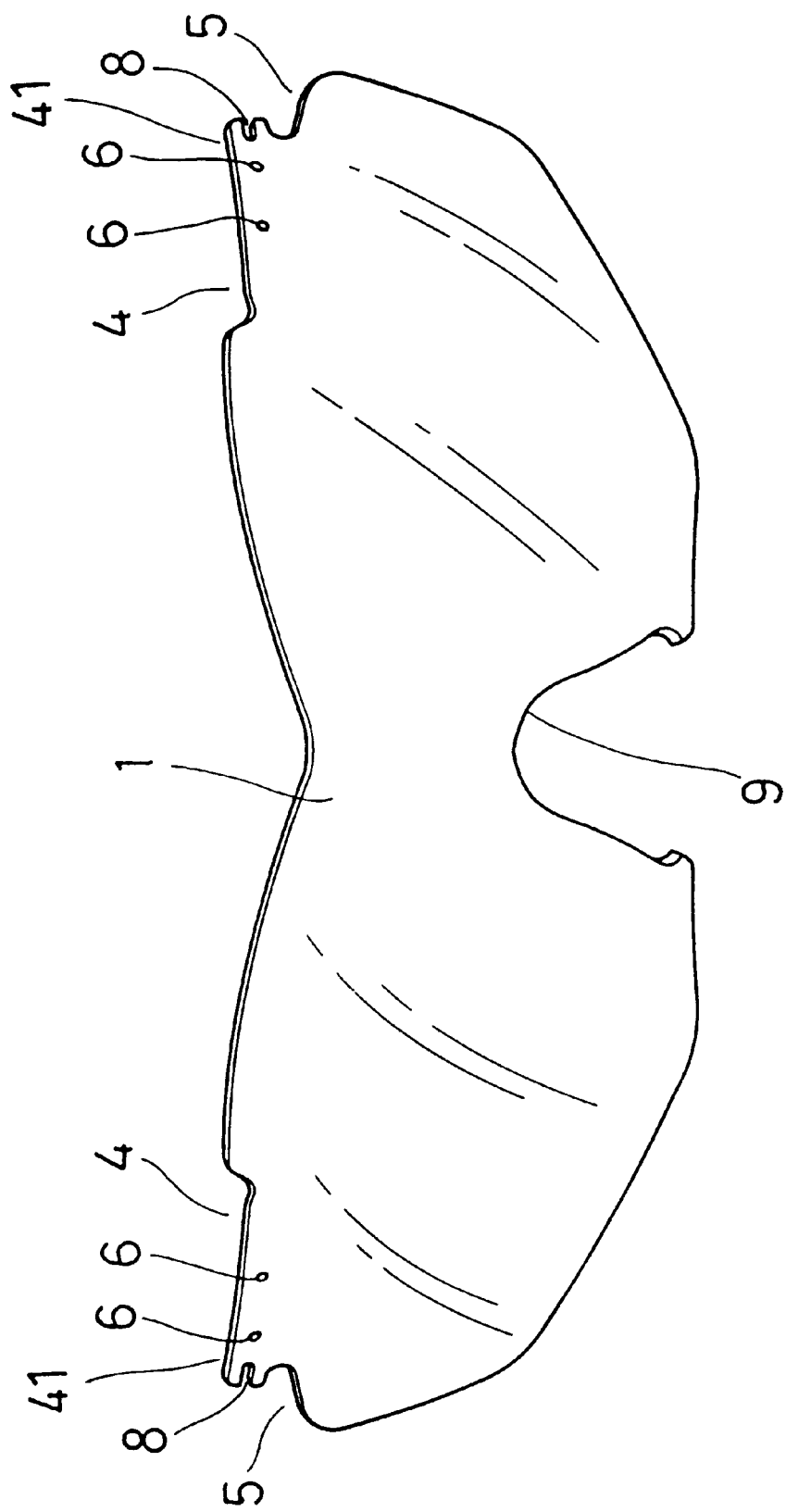
FIG. 4 is a perspective front view of an eyeglass main body in the embodiment of eyeglasses according to the present invention.

As shown in FIG. 4, a first notch 4 and a second notch 5 are formed continuously and outward at each of the upper end portions on the left and right sides of the eyeglass main body 1 to thereby provide a two-step shape inclined downward. Two screw holes 6 are provided in the neighborhood of the first notch 4 to allow the temple attachment member 2 to be fixed to the eyeglass main body 1 by screws 7 (see FIG. 3) from within. Cuts 8 are provided laterally on the outer end portion of the shoulders 41 of the eyeglass main body 1. An approximately V-shaped cut nose pad member attachment part 9 is formed at the lower central portion of the eyeglass main body 1, and a nose pad 10 is attached to the nose pad member attachment part 9 (see FIG. 1).

The fork-shaped (or bifurcated) temple attachment member 2 is approximately V-shaped and consists of a relatively short fixed part 2a and a longer rocking part 2b. The temple attachment member 2 is positioned on the upper front portion of each of the left and right side portions of the eyeglass main body 1. In other words, the temple attachment member 2 is provided in a space given by the first notch 4, thereby preventing the temple attachment member 2 from protruding upward with respect to the upper end periphery at the center of the eyeglass main body 1. The rocking part 2b can be rocked horizontally in front of the eyeglass main body 1.

The temple attachment member 2 can be made of a flexible material such as nylon resin and as best seen from FIG. 2 the fixed part 2a and the rocking part 2b are integral to each other. It is also possible to independently form the fixed part 2a and the rocking part 2b with an inflexible material and couple the fixed part 2a to the rocking part 2b by a flexible member.

Figure 5:
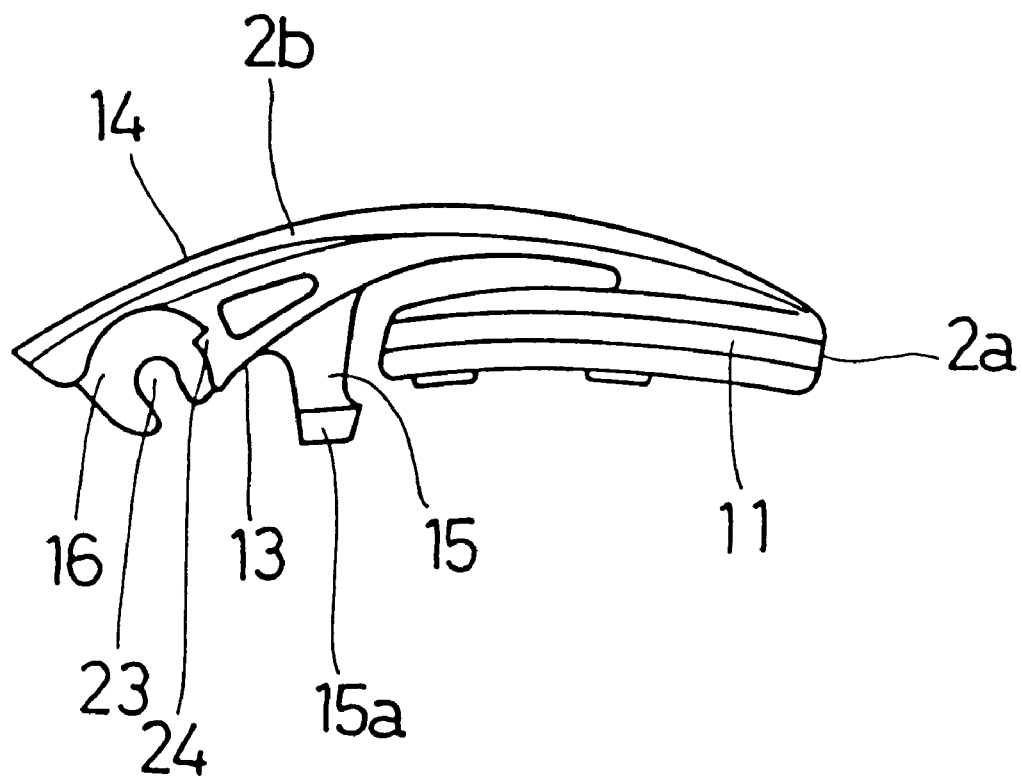
FIG. 5 is a bottom view of a right-side temple attachment member in the embodiment of eyeglasses according to the present invention.
Figure 6:
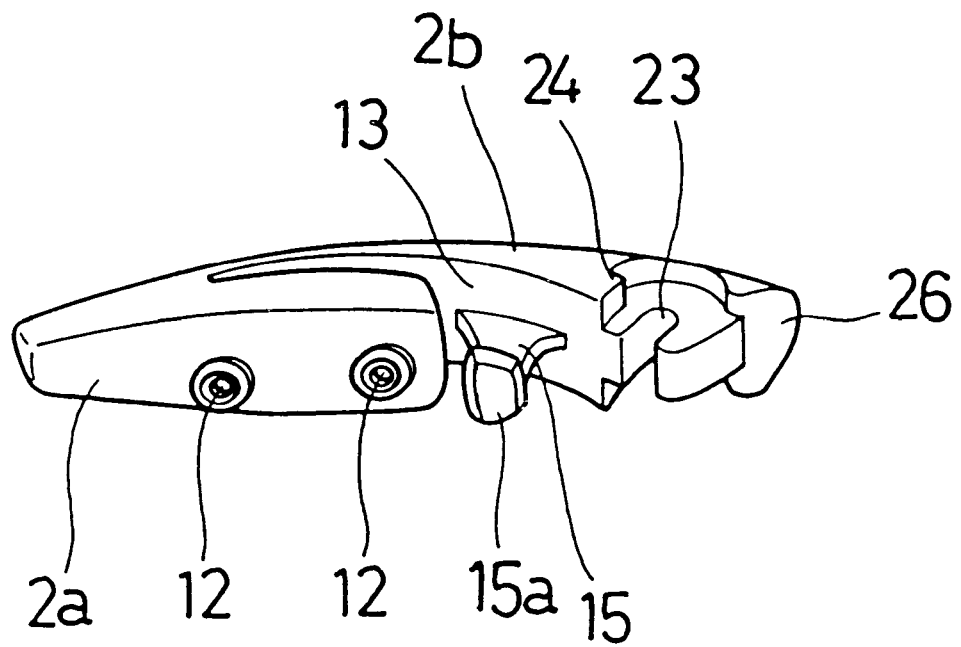
FIG. 6 is a perspective view of the right-side temple attachment member in the embodiment of eyeglasses according to the present invention.

As seen from FIG. 5, a fitting groove 11 is provided on the lower surface of the fixed part 2a of the temple attachment member 2 so as to be fitted into the eyeglass main body 1. Further as shown in FIG. 6, two screw holes 12 leading to the fitting groove 11 are provided on the inner side surface of the fixed part 2a of the temple attachment member 2. The temple attachment member 2 is fixedly attached to the eyeglass main body 1 by fitting the fitting groove 11 into an area in which the screw holes 6 are provided and then screwing screws 7 into the screw holes 12 of the fixed part 2a and the screw holes 6 of the eyeglass main body 1.

The rocking part 2b is arc-shaped so that the eyeglass main body 1 continues to the temple 3 and provides a natural curve. While no external force is applied to the rocking part 2b, the neighborhood of the joint of the rocking part 2b is expanded slightly forward and the outer end portion thereof is bent to reach into the second notch 5 of the eyeglass main body 1. The rocking part 2b has an inner surface 13 curved more sharply than the outer surface 14 and is gradually thicker from the joint toward the outer end portion.

Figure 7:
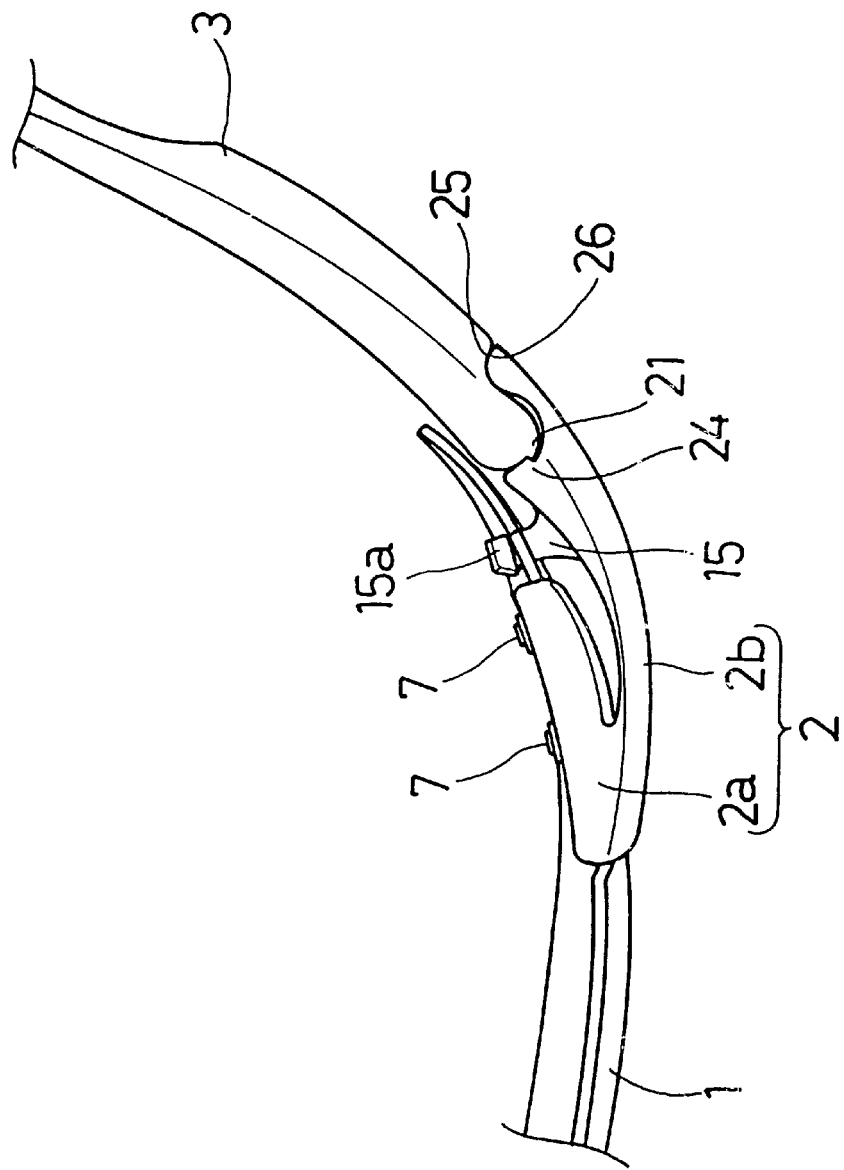
FIG. 7 is a partially enlarged perspective view of the embodiment of eyeglasses according to the present invention.

Further, a hook 15 is provided on the inner surface 13 of the rocking part 2b in such a manner that the hook 15 protrudes to fit into the cut 8 the eyeglass main body 1. The tip end portion 15a of the hook 15 is made larger than the width of the cut 8. As shown in FIG. 7, the tip end portion 15a is hooked to the eyeglass main body 1 to thereby prevent the rocking part 2b from opening beyond a predetermined level. The hook 15, thus, serves to prevent the rocking part 2b from excessively opening so as to restrain the deformation of the eyeglass main body 1.

A temple attachment part 16 is, as shown in FIG. 5, provided on the outer end portion of the rocking part 2b to rotatably attach the temple 3 to the temple attachment member 2. The temple attachment part 16 is positioned in the vicinity of the second notch 5 of the eyeglass main body 1.

Figure 8:
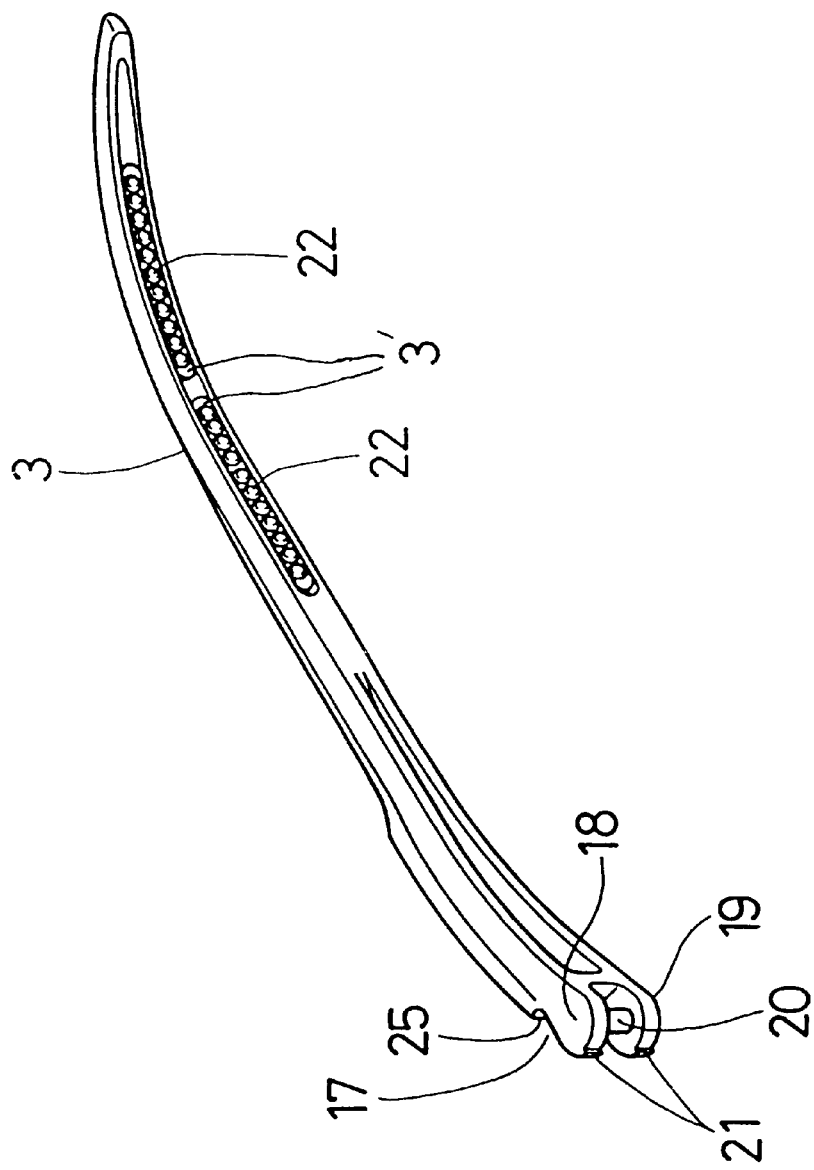
FIG. 8 is a perspective view of the right-side temple in the embodiment of eyeglasses according to the present invention.

Desirably, the temple 3 is made of the same material as that of the temple attachment member 2 and, as shown in FIG. 8, is flexible, resilient and arc-shaped as a whole to be fitted to the head of a user. A notch 17 is, as shown in FIG. 8, formed on the outer front end portion of the temple 3. The front end portion of the temple 3 is fork-shaped consisting of an upper end 18 and a lower end 19, and a shaft 20 having a circular section is provided between the upper end 18 and the lower end 19. In addition, protrusions 21 are formed on the upper and lower ends 18 and 19. Each of the protrusions 21 is shaped so that two semi-circularly shaped portions with the outside one slightly shifted forward are connected to each other.

Further, the temple 3 is provided with a non-slip attachment hole 3' which is elongated from approximately the center of the temple toward its free end and passes the temple 3 laterally. Non-slip members 22 made of an elastic material such as rubber and having protrusions on the surfaces thereof are fitted into the non-slip attachment hole 3'.

As shown in FIG. 5, a rotation groove 23 is provided in and vertically passes through the temple attachment part 16 of the rocking part 2b so that the shaft 20 of the temple 3 rotatably fits into the groove 23. The periphery of the rotation groove 23 is, as shown in FIG. 6, stepped down on the upper and lower surfaces of the rocking part 2b and a portion in the vicinity of the inner side surface 13 of the surrounding wall is protruded inward, thereby providing a detent 24 that comes into contact with the protrusions 21 formed on the front end portion of the temple 3.

Since the temple 3 is attached to the rocking part 2b of the temple attachment member 2 by fitting the shaft 20 of the temple 3 into the rotation groove 23, the overall structure is highly resistant to wear and torsion and the temple 3 does not easily come off the rocking part 2b. Further, a shoulder portion 25 is formed on the front end of the temple 3 so as to contact with the outer end face 26 of the rocking part 2b at the same time that the protrusions 21 hook contact the detent 24, therefore, it is possible to attach the temple 3 to the rocking part 2b without being excessively loose.

Figure 9:
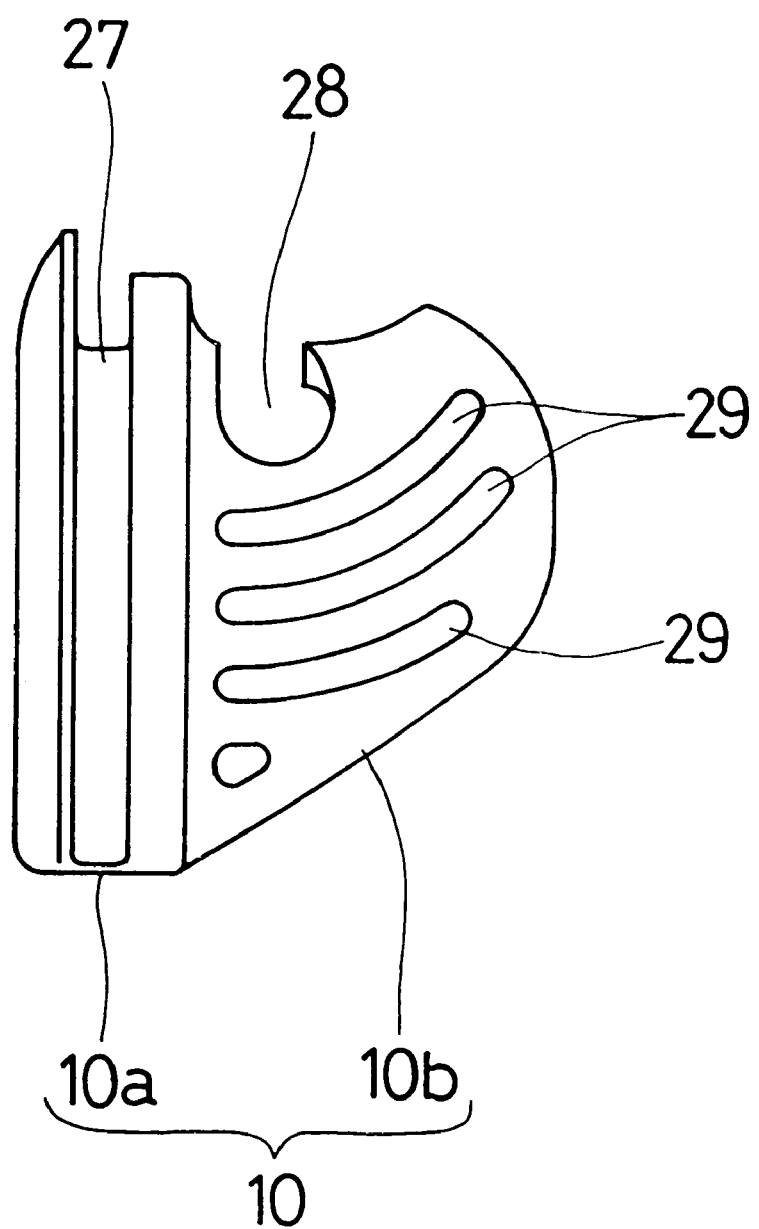
FIG. 9 is a side view of a nose pad member in the embodiment of eyeglasses according to the present invention.
Figure 10:
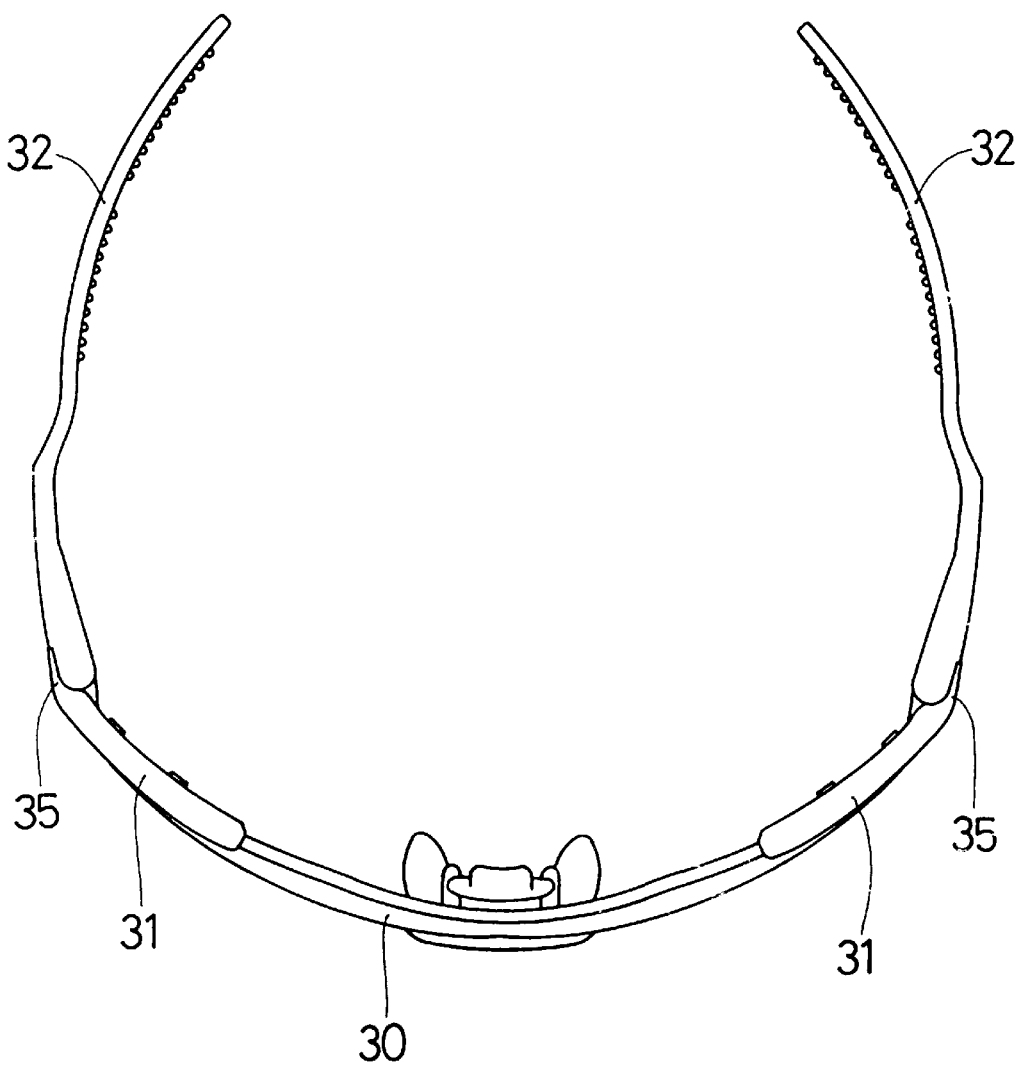
FIG. 10 is a plan view of conventional eyeglasses.
Figure 11:
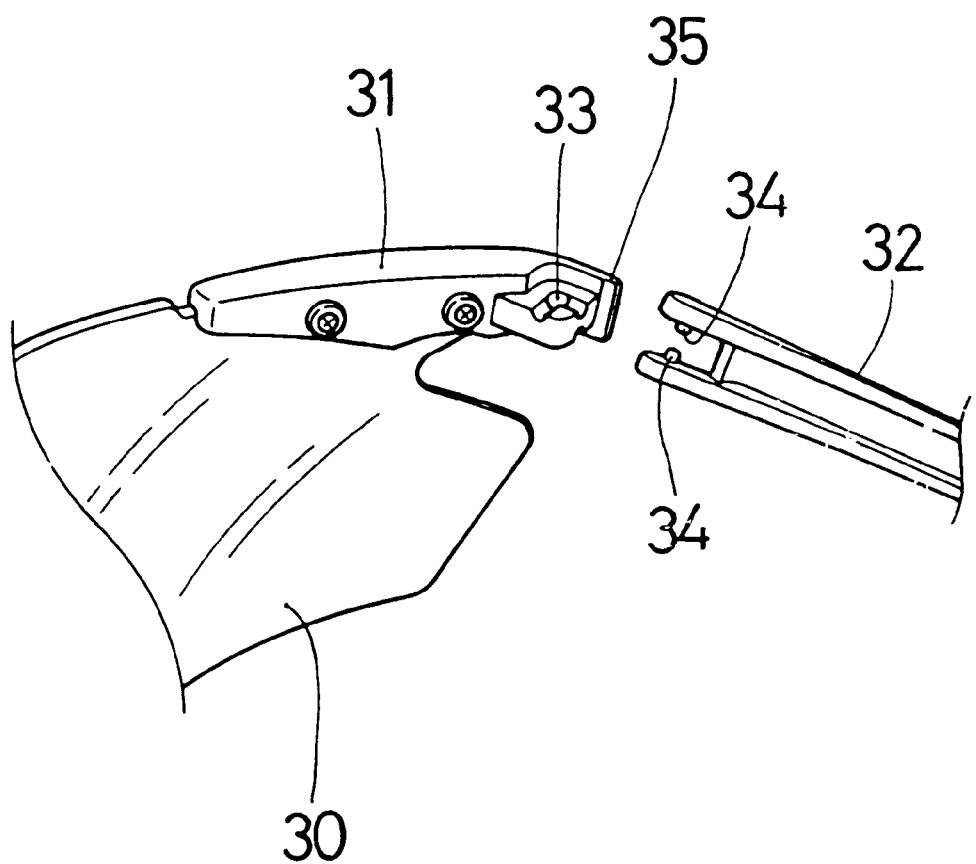
FIG. 11 is a partially enlarged perspective view of the conventional eyeglasses.

As shown in FIG. 9, the nose pad member 10 is formed by integrating a retaining part 10a which is approximately V-shaped if seen from the front, into a nose pad part 10b formed along the shape of a nose, and a tightening groove 27 is provided on the upper peripheral surface of the retaining part 10a. With the tightening groove 27, the nose pad member 10 is attached tightly to the nose pad member attachment part 9 of the eyeglass main body 1. An elongated hole 28 is provided laterally at the upper central portion of the nose pad part 10b of the nose pad member 10, and a plurality of curved holes 29 which extend back-and-forth are provided on both sides of the nose pad part 10b.

The nose pad member 10 is preferably made of a relatively hard material such as plastic rather than a soft material such as rubber to ensure that the tightening groove 27 is attached tightly to the nose pad member attachment part 9 of the eyeglass main body 1. With the above-stated structure of the nose pad member 10, the nose pad part 10b is flexible enough to gently contact with and fit to the nose even if the member 10 is made of a relatively hard material.

Moreover, the tightening groove 27 may be fixedly attached to the nose pad member attachment part 9 by an adhesive. Alternatively, the nose pad member 10 may be made of an elastic material and the retaining part 10a is formed into an approximately V shape having a wider angle than that of the nose pad member attachment part 9 to thereby press-contact the retaining part 10a with the nose pad member attachment part 9.

The eyeglass structure described above has a pair of left and right temples 3 attached to the eyeglass main body 1 through the temple attachment members 2, respectively. Due to this, even if the angle of the temple 3 is wider, the eyeglass main body 1 is hardly deformed and the original curve of the eyeglass main body 1 can be maintained.

Specifically, if the temple 3 is opened outward, the protrusions 21 of the temple 3 are engaged with the detent 24 and the shoulder portion 25 contacts the outer end face 26 of the rocking part 2b of the temple attachment member 2 to thereby limit the rotation of the temple 3. A force to open the temple 3 outward is applied to the rocking part 2b of the temple attachment member 2 but it is not directly applied to the eyeglass main body 1. The temple 3 is rotated around the joint of the rocking part 2b positioned forward with respect to the shaft 20 on the front end portion of the temple 3. Due to this, the angles of the left and right temples 3 do not become unnecessarily wider and the back end portions thereof are not separated from the head of the user completely. The back end portions gently contact the head and are well fit thereto.

Therefore, even if the eyeglass main body 1 has 6 curves or more, the temples 3 can be opened wide without deforming the eyeglass main body 1, allowing the main body 1 to maintain its curvature. Besides, since the temples 3 can fit to the head without pinching it, the eyeglasses are considerably comfortable to wear even for a user having a head of large dimensions.

It is noted that the present invention would not be limited to the above-described embodiment and that the design can be modified as required. For instance, the present invention may be a two-lens structure for eyeglasses, goggles and sunglasses of various types.

As seen from the above description, the eyeglasses according to the present invention have a temple attachment member(s) provided between the eyeglass main body and the temple(s). Accordingly, when the temple(s) is opened, the original curve of the eyeglass main body can be kept as is without a bending force directly applied to the eyeglass main body. In addition, even if the eyeglass main body is designed sharply curved, the temple(s) gently contact the head and the eyeglass are, therefore, comfortable to wear.

What is claimed is:

1. Eyeglasses comprising:

an eyeglass main body;

a pair of left and right temples; and a pair of separate temple attachment members, each of said separate temple attachment members has a fork shape consisting of a fixed part fixedly attached to said eyeglass main body and a rocking part to which one end of each of said temples is attached.

2. The eyeglasses according to claim 1, wherein each of said temple attachment members is provided on an upper front surface of each of left and right side portions of the eyeglass main body.

3. The eyeglasses according to claim 2, wherein said eyeglass main body is a single-lens structure.

4. The eyeglasses according to claim 3, wherein said rocking part of each of said temple attachment members is provided with a hook-shaped member to hook the eyeglass main body when the rocking part is opened a predetermined amount to thereby prevent said rocking part from being opened beyond said predetermined amount.

5. The eyeglasses according to claim 2, wherein said rocking part of each of said temple attachment members is provided with a hook-shaped member to hook the eyeglass main body when the rocking part is opened a predetermined amount to thereby prevent said rocking part from being opened beyond said predetermined amount.

6. The eyeglasses according to claim 1, wherein said eyeglass main body is a single-lens structure.

7. The eyeglasses according to claim 6, wherein said rocking part of each of said temple attachment members is provided with a hook-shaped member to hook the eyeglass main body when the rocking part is opened a predetermined amount to thereby prevent said rocking part from being opened beyond said predetermined amount.

8. The eyeglasses according to claim 1, wherein said rocking part of each of said temple attachment members is provided with a hook-shaped member to hook the eyeglass main body when the rocking part is opened a predetermined amount to thereby prevent said rocking part from being opened beyond said predetermined amount.

* * * * *